(12) United States Patent
Bishop et al.

(10) Patent No.: US 11,216,302 B2
(45) Date of Patent: *Jan. 4, 2022

(54) MODIFYING TASK DEPENDENCIES AT WORKER NODES USING PRECOMPILED LIBRARIES

(71) Applicant: salesforce.com, inc., San Francisco, CA (US)

(72) Inventors: Elden Gregory Bishop, San Francisco, CA (US); Jeffrey Chao, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/396,522

(22) Filed: Apr. 26, 2019

(65) Prior Publication Data

US 2019/0250947 A1 Aug. 15, 2019

Related U.S. Application Data

(63) Continuation of application No. 15/265,817, filed on Sep. 14, 2016, now Pat. No. 10,275,278.

(51) Int. Cl.
*G06F 9/46* (2006.01)
*G06F 9/48* (2006.01)
(Continued)

(52) U.S. Cl.
CPC .............. *G06F 9/4881* (2013.01); *G06F 8/71* (2013.01); *G06F 9/44521* (2013.01);
(Continued)

(58) Field of Classification Search
None
See application file for complete search history.

(56) References Cited

U.S. PATENT DOCUMENTS

| 8,015,392 B2 * | 9/2011 | Naik | ................ G06F 8/656 |
| | | | 712/32 |
| 2016/0085809 A1 | 3/2016 | de Castro Alves et al. | |

OTHER PUBLICATIONS

Paal et al., "Customizable Deployment, Composition, and Hosting of Distributed Java Application", CoopIS/DOA/ODBASE 2002, LNCS 2519, pp. 845-865, 2002 (Year; 2002).

* cited by examiner

Primary Examiner — Bing Zhao
(74) Attorney, Agent, or Firm — Sterne, Kessler, Goldstein & Fox P.L.L.C.

(57) ABSTRACT

The technology disclosed provides a novel and innovative technique for compact deployment of application code to stream processing systems. In particular, the technology disclosed relates to obviating the need of accompanying application code with its dependencies during deployment (i.e., creating fat jars) by operating a stream processing system within a container defined over worker nodes of whole machines and initializing the worker nodes with precompiled dependency libraries having precompiled classes. Accordingly, the application code is deployed to the container without its dependencies, and, once deployed, the application code is linked with the locally stored precompiled dependencies at runtime. In implementations, the application code is deployed to the container running the stream processing system between 300 milliseconds and 6 seconds. This is drastically faster than existing deployment techniques that take anywhere between 5 to 15 minutes for deployment.

20 Claims, 5 Drawing Sheets

(51) Int. Cl.
*G06F 9/50* (2006.01)
*G06F 9/455* (2018.01)
*G06F 8/71* (2018.01)
*G06F 9/445* (2018.01)

(52) U.S. Cl.
CPC ........ *G06F 9/4552* (2013.01); *G06F 9/45504* (2013.01); *G06F 9/5072* (2013.01)

MODIFYING TASK DEPENDENCIES AT WORKER NODES USING PRECOMPILED LIBRARIES

CROSS REFERENCE TO RELATED APPLICATIONS

This application is a continuation of U.S. application Ser. No. 15/265,817, filed Sep. 14, 2016, which is incorporated herein by reference in its entirety.

FIELD OF THE TECHNOLOGY DISCLOSED

The technology disclosed relates generally to data processing apparatus and corresponding methods for the retrieval of data stored in a database or as computer files, and in particular relates to facilitating compact task deployment in stream processing systems.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

In today's world, we are dealing with huge data volumes, popularly referred to as "Big Data". Web applications that serve and manage millions of Internet users, such as Facebook™, Instagram™, Twitter™, banking websites, or even online retail shops, such as Amazon.com™ or eBay™ are faced with the challenge of ingesting high volumes of data as fast as possible so that the end users can be provided with a real-time experience.

Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are in areas likes smart cities (regions), smart car and mobility, smart home and assisted living, smart industries, public safety, energy and environmental protection, agriculture and tourism.

Stream processing is quickly becoming a crucial component of Big Data processing solutions for enterprises, with many popular open-source stream processing systems available today, including Apache Storm Trident™, Apache Spark™, Apache Samza™ Apache Flink™, Apache Flume™, and others. Low-latency and real-time processing is the hallmark of these systems. However, existing development environments that generate the application code for implementing real-time streaming applications have not fully adapted to the stringent low-latency requirements of these systems.

Therefore, an opportunity arises to eliminate existing code deployment techniques that introduce latency to stream processing systems. Low-latency operations and memory efficiencies may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
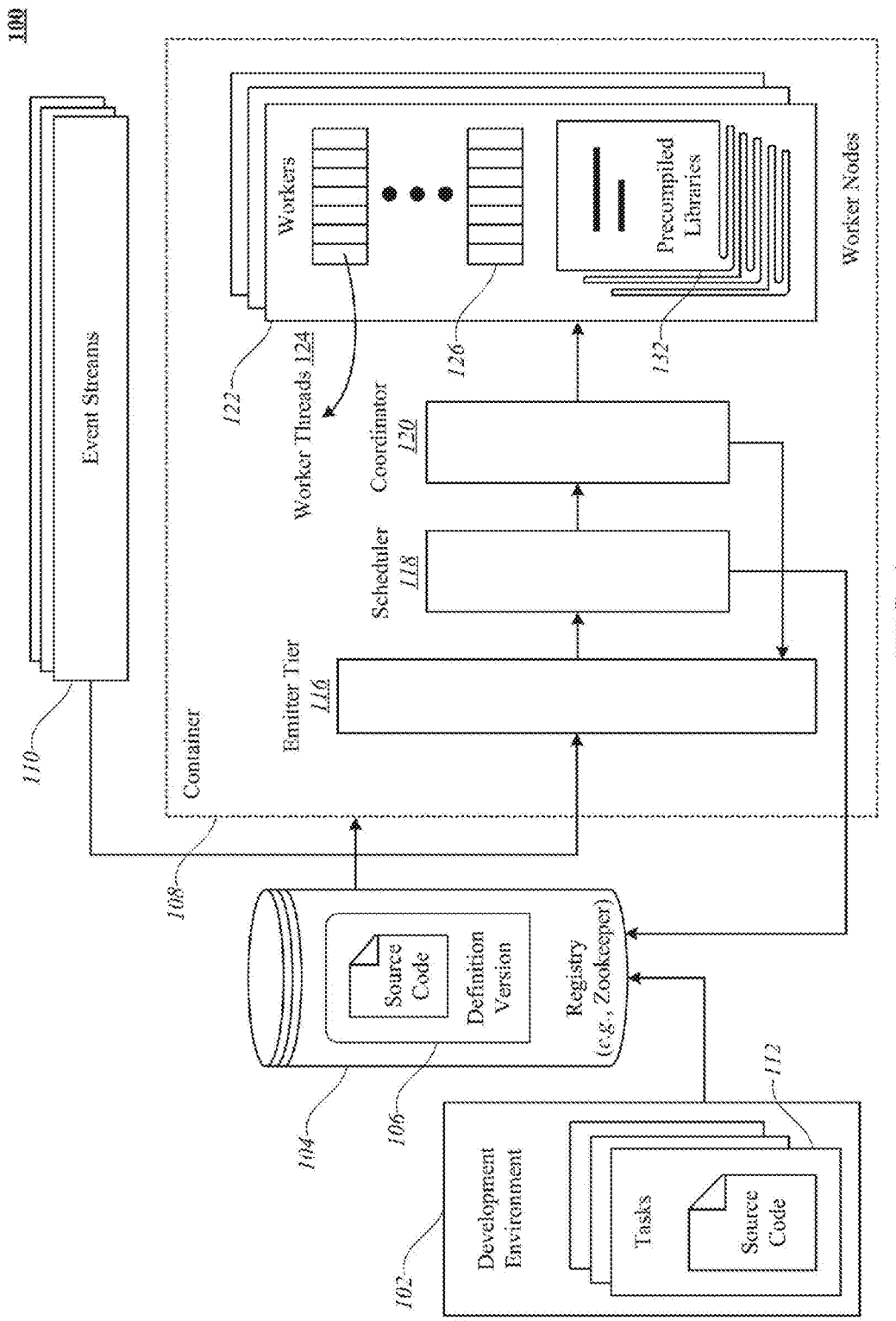
FIG. 1 shows one implementation of a container implementing a stream processing system using the disclosed compact task deployment.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The discussion is organized as follows. First, an explanation of terminology that will be used throughout the discussion is provided, followed by an introduction describing some of the technical problems addressed and technical solutions offered by various implementations. Then, a high-level description of a container and deployment of application code within container will be discussed at an architectural level. Next, more focused actions for implementing the system, together with linking of the precompiled libraries with the application code without recompilation is discussed. Lastly, some particular implementations are discussed.

Terminology

Task: As used herein, a "task" is defined as application logic, application code, or source code for a streaming application that runs in a stream processing system. In some implementations, a task in programming logic that defines a directed acyclic graph for processing real-time events. In other implementations, a task is programming logic that sets a filter for qualifying events from the event streams. In one example of Apache Storm™, a task is application code that defines processing logic within a Storm topology. For example, a task can be a Storm spout or bolt defined in any programming language such as Java™, Scala™ and Clojure™. The following is an example of a task implementing a Storm bolt that splits sentences into words according to one implementation:

```
class SplitSentence implements IRichBolt {
        private OutputCollector collector;
        public void prepare(Map conf, TopologyContext
        context, OutputCollector
        collector) {
            this. Collector = collector;
}
        public void execute(Tuple tuple) {
            String sentence = tuple.getString(0);
            for(String word: sentence. split(" ")) {
                collector.emit(new Values(word));
            }
}
        public void cleanup( ) {
        }
        public void declareOutputFields(OutputFieldsDeclarer
        declarer) {
            declarer.declare(new Fields("word"));
        }
}
```

Task Modification: As used herein, a "task modification" refers to changes made an already deployed streaming application by deploying adding new code to the application code of the streaming application or updating code components like parameters, classes, methods, constructors of existing application code.

Container: A stream processing system is built using an API (application programming interface) and deployed as a cluster called a "container". The container takes care of the distribution of tasks/jobs within a given infrastructure and the API is designed to handle message passing, task/job discovery and fault-tolerance.

Worker Node: A container groups a set of physical machines called "worker nodes".

Workers: Once deployed, a container operates over of a set of so-called "workers". A worker utilizes a processor core of a worker node and runs a set of code processes (e.g., Java processes) called worker threads that are distributed over the worker node. A worker also executes the logic of a set of tasks/jobs for different elements and components (e.g., emitters and transformers) of a container.

Event Stream: An event stream is defined as a sequence of operations performed on a group of event tuples from one or more real-time data streams. In one implementation, the grouping is on a tuple-by-type basis. In another implementation, the grouping is on batch-by-batch basis. In some implementations, each pipeline is identified by a unique pipeline identifier (ID). In one implementation, multiple real-time data streams can source data to one or more pipelines. In another implementation, a real-time data stream is queued to a task sequence in a single pipeline, which in turn is processed over a single container.

Coordinator: The coordination between an event stream that includes data to be processed and the worker nodes that process the data is carried out through a software component of the container called a "coordinator", which is in charge of distribution of tasks to the workers in a worker node.

Scheduler: A scheduler tracks one or more event streams in a container and communicates with the coordinator to schedule execution of batches in the container via the workers. In some implementations, a scheduler maintains the current batch stage information during multi-stage processing of a batch and communicates this information along with identification of the batch and pipeline to the coordinator.

Real-Time Data Stream: A real-time data stream is defined as an unbounded sequence of event tuples that is processed in parallel and distributed among multiple worker nodes. In one implementation, a real-time data stream is defined as a collection of real-time events for a task sequence or a particular stage of a task sequence. In another implementation, a real-time data stream is defined as a collection of events that are registered as they are generated by an entity. In one implementation, a real-time data stream is an unbounded sequence of data tuples. In some implementations, a real-time data stream has an emission rate of one million events or tuples per second.

Stream Processing System: A "stream processing system" is defined as a real-time stream processing framework that represents an entire streaming application as a graph of computation. In some implementations, the stream processing system processes real-time data streams to generate real-time analytics.

Event: An event is any identifiable unit of data that conveys information about an occurrence. In one implementation, an event can also provide information concerning an entity. An event can have three aspects: a timestamp indicating when the event occurred; a set of dimensions indicating various attributes about the event; and a set of metrics related to the event. Events can be user-generated events such as keystrokes and mouse clicks, among a wide variety of other possibilities. System-generated events include statistics (e.g., latency/number of bytes, etc.), program loading and errors, also among a wide variety of other possibilities. In one implementation, events include network flow variables, device information, user and group information, information on an application (e.g., resource condition, variables and custom triggered events). An event typically represents some message, token, count, pattern, value, or marker that can be recognized within a real-time data stream, such as network traffic, specific error conditions or signals, thresholds crossed, counts accumulated, and so on. A typical user interaction with an application like Pardot™ processes a sequence of events that occur in the context of a session. The main events of note are (a) login—provide user credentials to a hosted service to authenticate the user; (b) application transactions—execute a set of application level transactions, e.g. add leads or define new operations; and (c) log-out—this event terminates the session with the server. In some implementations, deep packet inspection logic tracks raw event data to identify events and stores them in an event repository. This application, in some implementations, interchangeably refers to "events" as "data", and vice-versa. Other examples of events generated by or about various entities include telemetry from a wearable sensor, data from a smart watch, data and/or metadata generated by a user using a feature of an application (such as Microsoft Word™), trip or journey data generated from a GPS used by a driver starting or completing a trip, data generated by a vehicle reporting speed or location information, data generated by a medical device reporting a sensor reading, etc.

Application Programming Interface: An "application programming interface (API)" is defined as a packaged collection of code libraries, methods and fields that belong to a set of classes, including its interface types. The API defines the way that developers and programmers can use the classes for their own software development, just by importing the relevant classes and writing statements that instantiate the classes and call their methods and fields. In another implementation, an API is a source code based specification intended to be used as an interface by software components to communicate with each other. An API can include specifications for routines, data structures, object classes and variables. Basically, an API provides an interface for developers and programmers to access the underlying platform capabilities and features of online social networks. For example, Twitter's Search API involves polling Twitter's data through a search or username. Twitter's Search API gives developers and programmers access to data set that already exists from tweets which have occurred. Through the Search API, developers and programmers request tweets that match search criteria. The criteria can be keywords, usernames, locations, named places, etc. In another example, Twitter's Streaming API is a push of data as tweets are posted in near real-time. With Twitter's Streaming API, developers and programmers register a set of criteria (e.g., keywords, usernames, locations, named places, etc.) and as tweets match the criteria, they are pushed directly to the developers and programmers. In yet another example, Twitter Firehose pushes data to developers and programmers in near real-time and guarantees delivery of all the tweets that match the set criteria.

Emitter: Data enters a container through a so-called "emitter". Emitters are event tuple sources for a container and are responsible for getting the event tuples into the container. In one implementation, emitters pull event tuples from input queues. In some implementations, emitters include user-specified conversion functions, such that they consume byte strings from an input queue and forward them as tuples to downstream transformers. An emitter retrieves one or more tasks/jobs to be executed by one or more workers of a worker node. The processing logic of an emitter is defined by a task.

Transformers: A transformer is a computation unit of a container that processes the incoming event tuples in the container and passes them to the next set of transformers downstream in the container. A transformer passes one or more tasks/jobs downstream, typically to be further transformed one or more workers of a worker node. The processing logic of an emitter is defined by a task.

Batch: A batch is defined as an assemblage of event tuples partitioned on a time-slice basis and/or a batch-size basis and sequentially queued in a pipeline. A time-slice based definition includes partitioning at least one incoming real-time data stream by its most recently received portion within a time window (e.g., one batch keeps the event tuples from the last one second). A batch-size based definition includes partitioning at least one incoming real-time data stream by a most recently received portion limited or restricted to or constrained by a data size (e.g., one batch includes 10 MB of most recently received event tuples). In other implementations, a combination of time-size basis and batch-size basis is used to define batches. In some other implementations, each batch in a pipeline is identified by a unique batch identifier (ID).

Multi-tenant Database System: As used herein, the term multi-tenant database system refers to those systems in which various elements of hardware and software of the database system can be shared by one or more users. For example, a given application server can simultaneously process requests for a great number of users, and a given database table can store rows for a potentially much greater number of users.

Identification: As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

Introduction

Recently, stream processing systems like Apache Storm Trident™, Apache Spark™ Apache Samza™, and Apache Flink™ have enabled collection and processing of real-time data. This has a number of application areas. Applications range from simple aggregation for billing to the real-time optimization of product recommendations based on current browsing history (or viewing history, in the case of a company like Netflix™). For most developers, "low latency" refers to the time it takes to service a given connection. Low-latency is generally desirable because there are only so many seconds in a day (86,400 as it happens) and the less time it takes to handle a single request, the more requests a single-machine can service. For real-time streaming applications, low-latency requirements are particularly high. Rather than referring to the return time for a single request, it low-latency in stream processing system refers to the amount of time between an event occurring somewhere at the "edge" of the system and it being made available to the processing and delivery frameworks. Thus, any stream processing component or technique that adds latency to the system is undesirable.

Deployment of real-time streaming applications using existing development environments remains a high-latency operation due to certain artifacts of batch processing system whose low-latency requirements were nowhere close to that of the current stream processing systems. Specifically, an organization utilizing a stream processing system constantly builds and deploys numerous real-time streaming applications, and updates their code implementations on a daily basis. However, deploying and running even one streaming application requires packaging the application classpath with its dependencies. Currently, this is handled by using build managers like Apache Maven™ that link the application code and the required dependencies into massive packages called "fat jars".

However, using fat jars adds great computational inefficiencies in current stream processing systems because they make the deployment of application code slow and inefficient. In one example, a Java™ application of size 150 kilobytes (KB), after being packaged as a fat jar, weighs in at 100 megabyte (MB) because of its dependencies. Deploying this fat jar to the stream processing system is a slow and cumbersome operation because it saturates the network cards on the application servers. The inefficiency caused by the fat jars is further exacerbated when the organization makes concurrent deployments on a daily basis (e.g., thousands of builds per day). Furthermore, each build invariably requires generation of a new fat jar, which stresses the backend storage of the stream processing system.

The technology disclosed provides a novel and innovative technique for compact deployment of application code to stream processing systems. In particular, the technology disclosed relates to obviating the need of accompanying application code with its dependencies during deployment (i.e., creating fat jars) by operating a stream processing system within a container defined over worker nodes of whole machines and initializing the worker nodes with precompiled dependency libraries having precompiled classes. Accordingly, the application code is deployed to the container without its dependencies, and, once deployed, the application code is linked with the locally stored precompiled dependencies at runtime. In implementations, the application code is deployed to the container running the stream processing system between 300 milliseconds and 6 seconds. This is drastically faster than existing deployment techniques that take anywhere between 5 to 15 minutes for deployment. In another implementation, the deployed application code is less than 1 MB, again, being significantly smaller than fat jars that often weigh anywhere between 100 MBs to 1 GB.

Implementations are described with reference to an implementation in which techniques for facilitating management of data in an on-demand services environment are implemented in a system having an application server providing a front end for an on-demand database service capable of supporting multiple tenants, implementations are not limited to multi-tenant databases nor deployment on application servers. The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm Trident™, Apache Spark™, Apace Kafka™, Apache Flink™, Truviso™, IBM Info-Sphere™, Borealis™ and Yahoo! S4™.

Compact Task Deployment

FIG. 1 shows one implementation of a container 100 implementing a stream processing system using the disclosed compact task deployment. FIG. 1 includes a development environment 102 with tasks 112, a container registry 102 with definition version 106, a container 108, event streams 110, emitter tier 116, scheduler 118, coordinator 120, worker nodes 122, workers 126 with worker threads 124 and precompiled libraries. In other implementations, platform 100 may not have the same elements as those listed above and/or may have other/different elements instead of, or in addition to, those listed above.

Development environment 102 can be an integrated development environment (IDE) such as Microsoft® Visual Studio®, Eclipse, Microsoft® Office or other IDE, executing on a computer having a processor and a memory. Development environment 102 may include a run time debugging module that includes a run time debug engine that monitors debug events occurring during execution of a task 112 during a debug session and provides one or more debug user interfaces such as a watch window, data tooltips and an expression evaluator and accepts user input within the debug user interface. Development environment 102 according to other implementations allows users to build and validate a given source code project 112 against a selected runtime environment using different compilers. Development environment 102 may create multiple output artifacts using different compilers that are each targeting the same selected runtime environment. For example, each compiler may be optimized in different ways. It will be understood that the term compiler as used herein includes build engines, interpreters, and validation engines.

Container registry or registry 104 (e.g., Apache Zookeeper™) is a centralized service that maintains state information for the container 108. In implementations of the technology disclosed, tasks 112, as source code, are deployed from the development environment to the container using the registry 104. Registry 104 hosts the tasks 112 until they are ready to be used by the workers 126 of the container 108. In one implementation, registry 104 also maintains a definition version 106 of the deployed tasks 112. As discussed supra, during deployment, the tasks 112 are uploaded to the registry 104 from the development environment 102 without their dependencies.

Precompiled libraries 132 include precompiled classes (shown in FIGS. 2 and 3) that together identify the dependencies required to execute the tasks 112. In one implementation, when container 108 is created, its worker nodes 122 are initialized with the precompiled libraries 132. In some implementations, the precompiled libraries 132 are stored in a Java Virtual Machine (JVM) instance of each of the worker nodes 122. In implementations, selection of the precompiled libraries 132 can be automatic as outlined by a service level agreement (SLA) or based on selection by a client, tenant, or system administrator.

In implementations of the technology disclosed, are a few different kinds of dependencies can be included in the precompiled libraries 132. One kind is "parent-child", in which the metadata components may depend on other components. For example, a custom field cannot be deployed without deploying its custom object as well because the field's existence depends on the object. These kinds of object dependencies are not always within the same object; they can be across different objects. For example, a relationship field on one object cannot be deployed without the target object being included in the deployment, or already present in the target organization. Another kind is "referenced file", in which every file that is referenced by another file must either be included in the deployment plan, or already present in the destination organization. For example, for a Visualforce™ page that references an image as a static resource and the image does not exist in the target organization, the image must be included in the deployment. The referenced file must be available through a metadata API. For example, if that same Visualforce™ page had referenced an image in a personal document folder, and all folders are included in the deployment plan, the deployment would fail because personal documents are not available via the metadata API. Yet another kind is "ordering", in which the dependencies require that components are deployed in a specific order, and within a single deploy operation, this order is handled automatically by the metadata API. However, if a subset of components is deployed, or the deployment is split into multiple batches, the ordering dependencies must be account for. Yet another kind is "mandatory fields", when an object is creating using an IDE of an application like Force.com™ or a Salesforce™ user interface, the tool enforces the creation of mandatory fields. Some examples of dependency packages or libraries include Salesforce.com's Formula Force library, Salesforce Metadata API, and Salesforce Expression Language API. In other implementations, different or additional dependencies can be included in the precompiled libraries 132 such that any conventional or future-developed dependencies, libraries, packages, and classes can be used.

Figure 2:
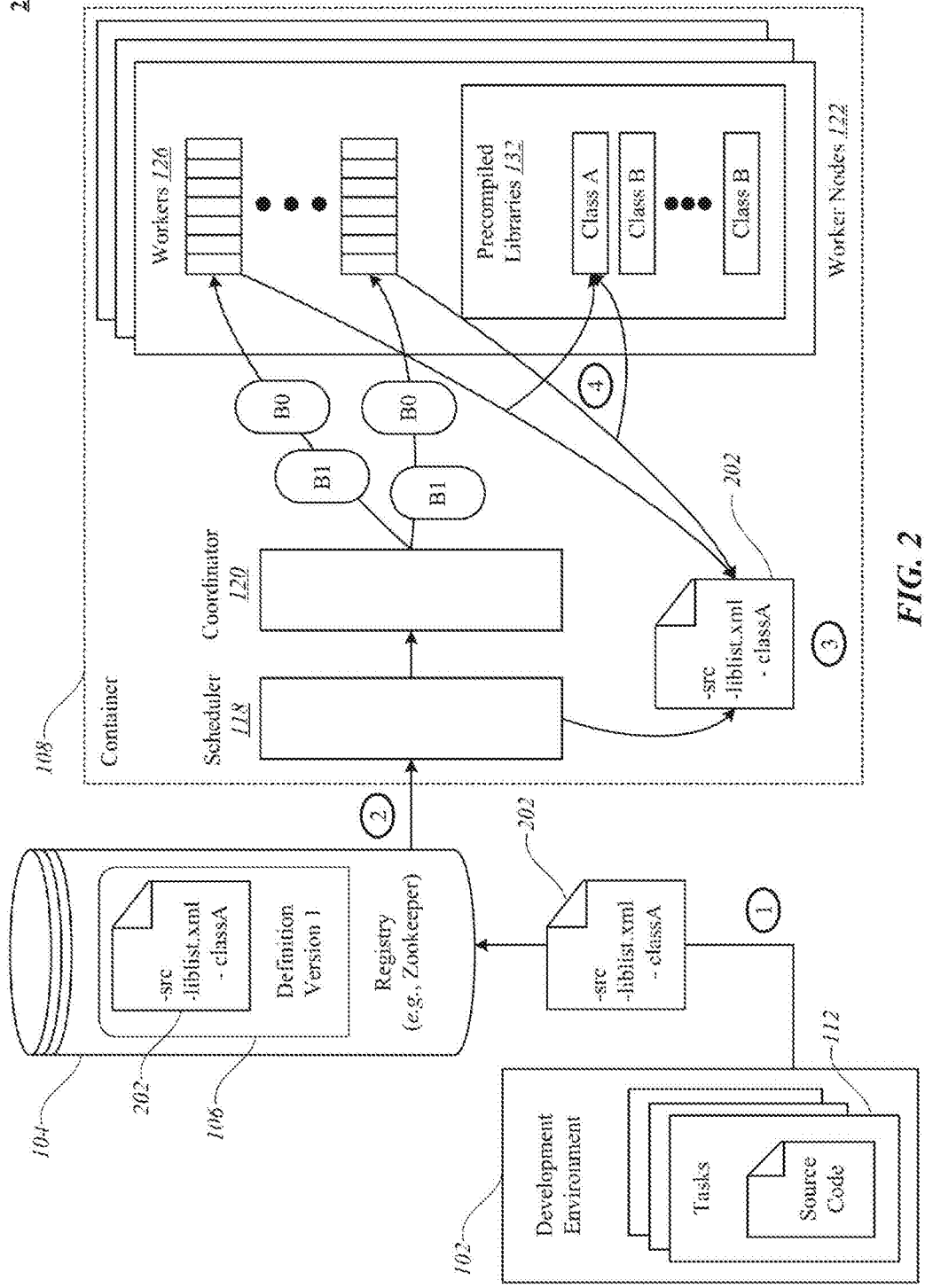
FIG. 2 illustrates one implementation of efficiently deploying a task to the container shown in FIG. 1.
Figure 3:
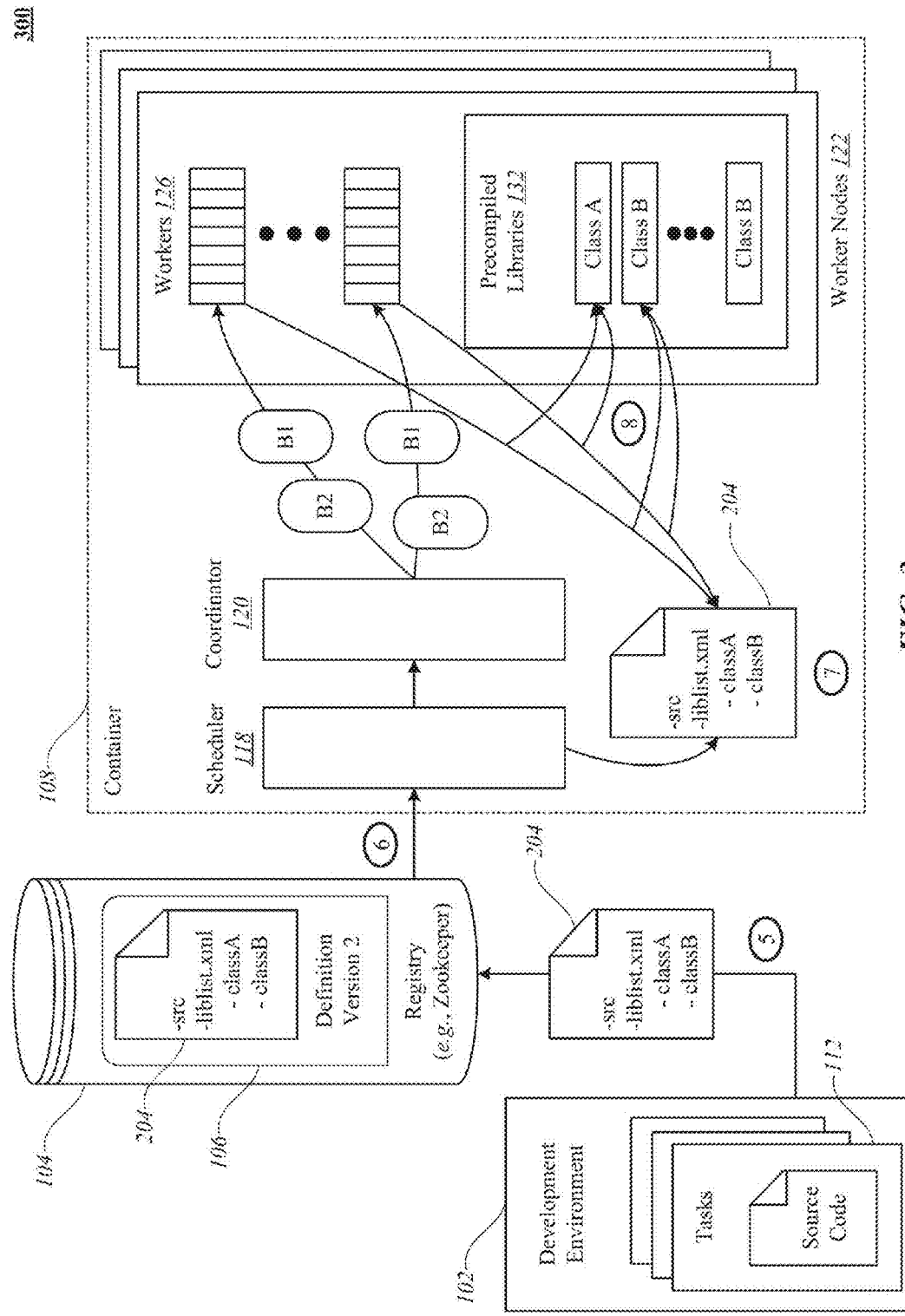
FIG. 3 depicts one implementation of efficiently making task modifications to the task deployed to the container in FIG. 2.

Note that even though, currently, the dependencies listed must be deployed with the application code, the technology disclosed obviates this traditional necessity by decoupling the deployment of application code from the required dependencies, as discussed infra with respect to FIGS. 2 and 3.

FIG. 2 illustrates one implementation of efficient deployment 200 of a task to the container 100 shown in FIG. 1. In FIG. 2, at action 1, a first task 202 is deployed from the development environment 102 to the registry 104. In the example shown in FIG. 2, source code of first task 202 includes application code (identified as "src") and a list identifying dependency libraries (identified as "liblist.xml") and classes (identified as "classA") needed to execute the application code. Note that first task 202 only identifies libraries and classes and does not include the actual dependencies, which are provided by the container 108 that locally stores the dependencies as precompiled libraries 132.

Moving ahead, at action 2, registry 104 maintains a definition version (e.g., definition version 1) of the first task 202 and publishes it to the scheduler 118. At this point, in some implementations, first task 202 is maintained at the registry 104 until batch B0 is dispatched by the coordinator 120 and completely processed by the workers 126 of the worker nodes 122. When the processing of batch B0 is completed and B1 is ready to be dispatched by the coordinator 120, scheduler 118 publishes the definition version 1 to the workers 126, at action 3. Workers 126, at runtime, reconfigure themselves to apply the processing logic specified in the first task 202. This is in contrast to existing stream processing systems like Apache Storm Trident™ and Apache Flume™ which, in addition to invariably requiring deployment of application code with dependencies as packaged fat jars, also require that, at deployment, the worker nodes are decommissioned and the workers stop execution. The technology disclosed obviates the need of decommissioning worker nodes during deployment of application code by requiring the workers 126 to reconfigure themselves to the latest definition version published by the scheduler 118. Furthermore, at action 4, workers 126 also link the first task 202 to its corresponding dependencies by evaluating the libist.xml and finding corresponding class or classes (e.g., classA) from the precompiled libraries 132. In implementations, linking the first task 202 to its corresponding dependencies from the precompiled libraries 132 does not require recompilation of the corresponding dependencies (e.g., precompiled class like classA) because they are precompiled.

FIG. 3 depicts one implementation of efficient execution 300 of task modifications to the first task 202 deployed to the container 100 in FIG. 2. Task 204 is a modification to the first task 202 of FIG. 2 because it includes an additional classB, as shown in FIG. 3's example. In FIG. 3, at action 5, a modified second task 204 is deployed from the development environment 102 to the registry 104. In the example shown in FIG. 3, source code of second task 204 includes application code (identified as "src") and a list identifying dependency libraries (identified as "liblist.xml") and classes (identified as "classA" and "classB") needed to execute the application code. Note that modified second task 204 only identifies libraries and classes and does not include the actual dependencies, which are provided by the container 108 that locally stores the dependencies as precompiled libraries 132.

Moving ahead, at action 6, registry 104 updates the definition version of the first task 202 to be definition version 2 corresponding to modified second task 204 and publishes the updated definition version 2 to the scheduler 118. At this point, in some implementations, modified second task 204 is maintained at the registry 104 until batch B1 is dispatched by the coordinator 120 and completely processed by the workers 126 of the worker nodes 122. When the processing of batch B1 is completed and B2 is ready to be dispatched by the coordinator 120, scheduler 118 publishes the definition version 2 to the workers 126, at action 7. Workers 126, at runtime, reconfigure themselves to apply the processing logic specified in the modified second task 204. This is in contrast to existing stream processing systems like Apache Storm Trident™ and Apache Flume™ which, in addition to invariably requiring deployment of application code with dependencies as packaged fat jars, also require that, at deployment, the worker nodes are decommissioned and the workers stop execution. The technology disclosed obviates the need of decommissioning worker nodes during deployment of application code by requiring the workers 126 to reconfigure themselves to the latest definition version published by the scheduler 118. Furthermore, at action 8, workers 126 also link the modified second task 204 to its corresponding dependencies by evaluating the libist.xml and finding corresponding class or classes (e.g., ClassA, classB) from the precompiled libraries 132. In implementations, linking the modified second task 204 to its corresponding dependencies from the precompiled libraries 132 does not require recompilation of the corresponding dependencies (e.g., precompiled classes like classA, classB) because they are precompiled.

Processes

Figure 4:
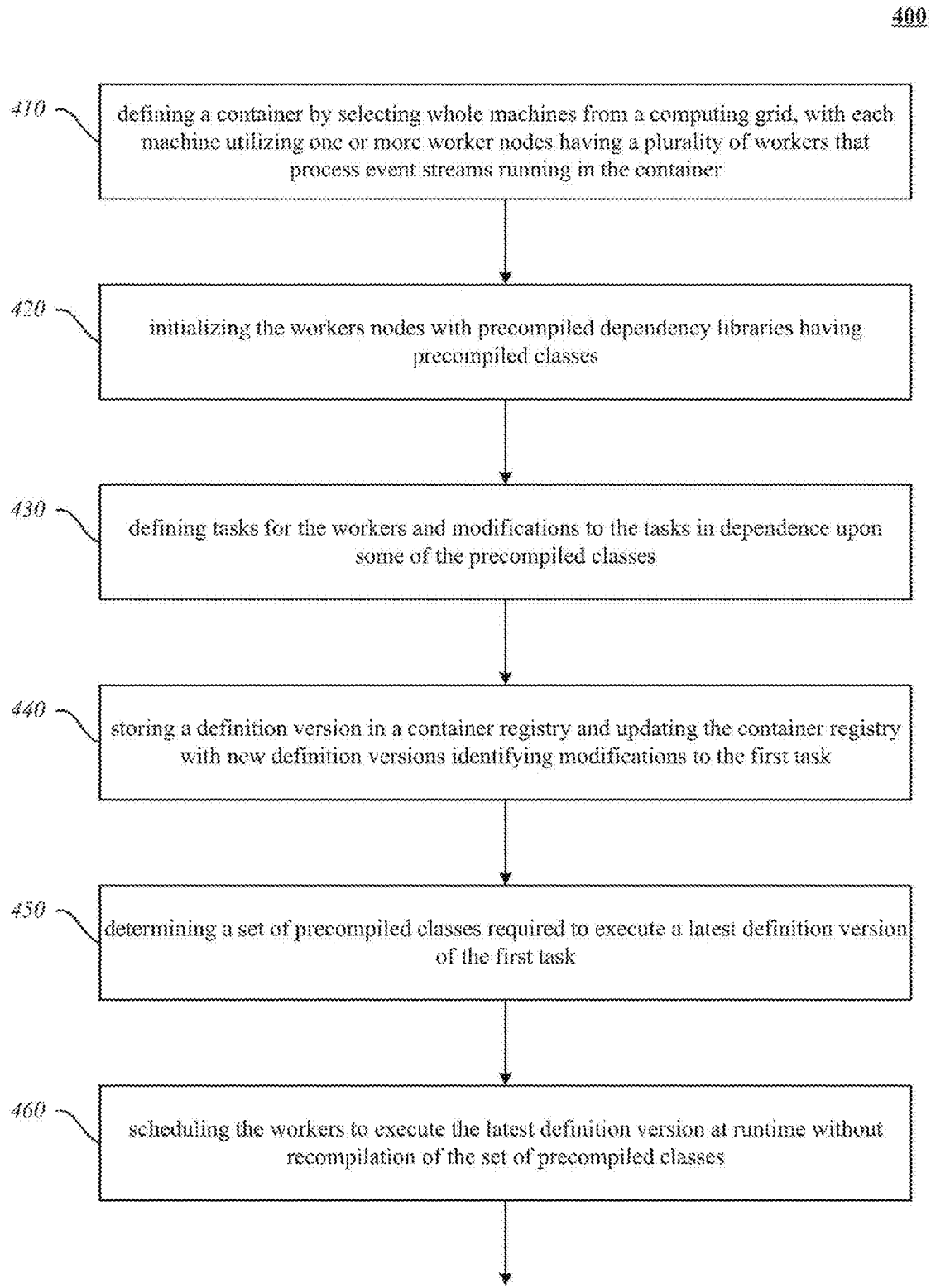
FIG. 4 is an operational flow diagram illustrating a high-level overview of an exemplary technique used to implement the compact task deployment for a stream processing system.

FIG. 4 is an operational flow diagram illustrating a high-level overview of an exemplary technique used to implement the compact task deployment for a stream processing system. Flowchart 400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 4. Multiple actions can be combined in some implementations. For convenience, this flowchart is described with reference to the system that carries out a method. The system is not necessarily part of the method.

At action 410, a container is defined by selecting whole machines from a computing grid, with each machine utilizing one or more worker nodes having a plurality of workers that process event streams running in the container, as discussed supra.

At action 420, the workers nodes are initialized with precompiled dependency libraries having precompiled classes, as discussed supra.

At action 430, tasks for the workers and modifications to the tasks are defined in dependence upon some of the precompiled classes, as discussed supra. In one implementation, the tasks are code that define a directed acyclic graph for processing events from event streams running the container. In some implementations, the events are continuous and unbounded sequence of real-time tuples. In another implementation, the tasks are code that set filters for qualifying events from the event streams.

At action 440, a definition version is stored in a container registry and updating the container registry with new definition versions identifying modifications to a first task, as discussed supra. In some implementations, the tasks and task modifications are deployed to the container by converting class definitions of the tasks and task modifications into binary serializations. In some implementations, the precompiled dependency libraries and the precompiled classes are stored in java virtual machines (JVMs) of the worker nodes.

At action 450, a set of precompiled classes required to execute a latest definition version of the first task are determined, as discussed supra. In one implementation, the set of precompiled classes are identified based on classpaths of the first task identified by the latest definition version and the set of precompiled classes are bounded to the classpaths.

At action 460, the workers are scheduled to execute the latest definition version at runtime without recompilation of the set of precompiled classes, as discussed supra. In some implementations, scheduler 118 is used to schedule the workers. In some implementations, the workers are scheduled to execute the latest definition version at runtime without decommissioning the worker nodes.

In implementations, the tasks and task modifications are deployed to the container between 300 milliseconds and 6 seconds. In implementations, the tasks and task modifications are less than 1 megabyte (MB) in size.

Multi-Tenant System

Figure 5:
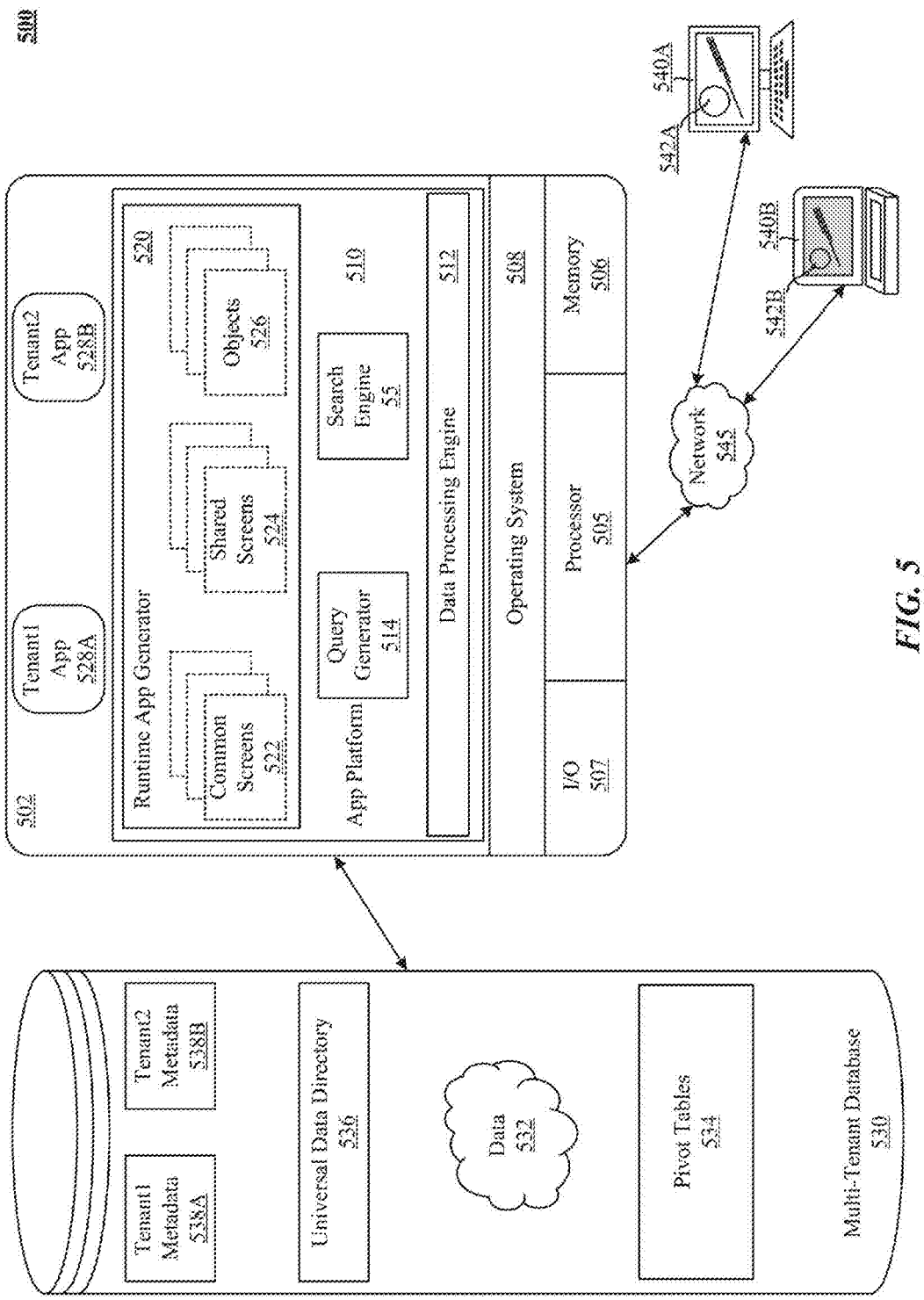
FIG. 5 is a block diagram of an exemplary multi-tenant system in which the technology disclosed is operated.

FIG. 5 is a block diagram of an exemplary multi-tenant system in which the technology disclosed is operated. In general, the illustrated multi-tenant system 500 of FIG. 5 includes a server 502 that dynamically creates and supports virtual applications 528A and 528B based upon data 532 from a common database 530 that is shared between multiple tenants, alternatively referred to herein as a "multi-tenant database". Data and services generated by the virtual applications 528A and 528B are provided via a network 545 to any number of client devices 540A and 540B, as desired. Virtual applications 528A and 528B are suitably generated at run-time (or on-demand) using a common application platform 510 that securely provides access to the data 532 in the database 530 for each of the various tenants subscribing to the multi-tenant system 500. In accordance with one non-limiting example, the multi-tenant system 500 is implemented in the form of an on-demand multi-tenant user relationship management (CRM) system that can support any number of authenticated users of multiple tenants.

As used herein, a "tenant" or an "organization" refers to a group of one or more users that shares access to common subset of the data within the multi-tenant database 530. In this regard, each tenant includes one or more users associated with, assigned to, or otherwise belonging to that respective tenant. Stated another way, each respective user within the multi-tenant system 500 is associated with, assigned to, or otherwise belongs to a particular tenant of the plurality of tenants supported by the multi-tenant system 500. Tenants may represent users, user departments, work or legal organizations, and/or any other entities that maintain data for particular sets of users within the multi-tenant system 500. Although multiple tenants may share access to the server 502 and the database 530, the particular data and services provided from the server 502 to each tenant can be securely isolated from those provided to other tenants. The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various implementations, the database 530 shares processing hardware with the server 502. In other implementations, the database 530 is implemented using separate physical and/or virtual database server hardware that communicates with the server 502 to perform the various functions described herein. In an exemplary implementation, the database 530 includes a database management system or other equivalent software capable of determining an optimal query plan for retrieving and providing a particular subset of the data 532 to an instance of virtual application 528A or 528B in response to a query initiated or otherwise provided by a virtual application 528A or 528B. The multi-tenant database 530 may alternatively be referred to herein as an on-demand database, in that the multi-tenant database 530 provides (or is available to provide) data at run-time to on-demand virtual applications 528A and 528B generated by the application platform 510.

In practice, the data 532 may be organized and formatted in any manner to support the application platform 510. In various implementations, the data 532 is suitably organized into a relatively small number of large data tables to maintain a semi-amorphous "heap"-type format. The data 532 can then be organized as needed for a particular virtual application 528A or 528B. In various implementations, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, work logic and other constructs that are common to multiple tenants. Tenant-specific formatting, functions and other constructs may be maintained as tenant-specific metadata 538A- and 538B for each tenant, as desired. Rather than forcing the data 532 into an inflexible global structure that is common to all tenants and applications, the database 530 is organized to be relatively amorphous, with the pivot tables 534 and the metadata 538A and 538B providing additional structure on an as-needed basis. To that end, the application platform 510 suitably uses the pivot tables 534 and/or the metadata 538A and 538B to generate "virtual" components of the virtual applications 528A and 528B to logically obtain, process, and present the relatively amorphous data 532 from the database 530.

The server 502 is implemented using one or more actual and/or virtual computing systems that collectively provide the dynamic application platform 510 for generating the virtual applications 528A and 528B. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware, such as a processor 505, memory 506, input/output features 507 and the like. The input/output features 507 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528A and 528B and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 528A and 528B that provide data and/or services to the client devices 540A and 540B. In a typical implementation, the application platform 510 gains access to processing resources, communications interfaces and other features of the processing hardware 505 using any sort of conventional or proprietary operating system 508. The virtual applications 528A and 528B are typically generated at run-time in response to input received from the client devices 540A and 540B. For the illustrated implementation, the application platform 510 includes a bulk data processing engine 512, a query generator 514, a search engine 55 that provides text indexing and other search functionality, and a runtime application generator 520. Each of these features may be implemented as a separate process or other module, and many equivalent implementations could include different and/or additional features, components or other modules as desired.

The runtime application generator 520 dynamically builds and executes the virtual applications 528A and 528B in response to specific requests received from the client devices 540A and 540B. The virtual applications 528A and 528B are typically constructed in accordance with the tenant-specific metadata 538, which describes the particular tables, reports, interfaces and/or other features of the particular application 528A and 528B. In various implementations, each virtual application 528A and 528B generates dynamic web content that can be served to a browser or other client programs 542A and 542B associated with its client device 540A and 540B, as appropriate.

The runtime application generator 520 suitably interacts with the query generator 514 to efficiently obtain multitenant data 532 from the database 530 as needed in response to input queries initiated or otherwise provided by users of the client devices 540A and 540B. In a typical implementation, the query generator 514 considers the identity of the user requesting a particular function (along with the user's associated tenant), and then builds and executes queries to the database 530 using system-wide metadata within a universal data directory (UDD) 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528A or 528B for that user and/or tenant.

Still referring to FIG. 5, the data processing engine 512 performs bulk processing operations on the data 532 such as uploads or downloads, updates, online transaction processing, and/or the like. In many implementations, less urgent bulk processing of the data 532 can be scheduled to occur as processing resources become available, thereby giving priority to more urgent data processing by the query generator 514, the search engine 55, the virtual applications 528A and 528B, etc.

In exemplary implementations, the application platform 510 is utilized to create and/or generate data-driven virtual applications 528A and 528B for the tenants that they support. Such virtual applications 528A and 528B may make use of interface features such as custom (or tenant-specific) screens 524, standard (or universal) screens 522 or the like. Any number of custom and/or standard objects 526 may also be available for integration into tenant-developed virtual applications 528A and 528B. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 532 associated with each virtual application 528A and 528B is provided to the database 530, as appropriate, and stored until it is requested or is otherwise needed, along with the metadata 538 that describes the particular features (e.g., reports, tables, functions, objects, fields, formulas, code, etc.) of that particular virtual application 528A and 528B. For example, a virtual application 528A and 528B may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

With continued reference to FIG. 5, the data and services provided by the server 502 can be retrieved using any sort of personal computer, mobile telephone, tablet or other network-enabled client device 540A or 540B on the network 545. In an exemplary implementation, the client device 540A or 540B includes a display device, such as a monitor, screen, or another conventional electronic display capable of graphically presenting data and/or information retrieved from the multi-tenant database 530. Typically, the user operates a conventional browser application or other client program 542 executed by the client devices 540A and 540B to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528A or 528B, the runtime application generator 520 suitably creates the application at run time based upon the metadata 538, as appropriate. As noted above, the virtual application 528A or 528B may contain Java, ActiveX, Apex, or other content that can be presented using conventional client software running on the client device 540A or 540B; other implementations may simply provide dynamic web or other content that can be presented and viewed by the user, as desired.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

For the sake of brevity, conventional techniques related to databases, user interfaces, and other functional aspects of the systems (and the individual operating components of the systems) may not be described in detail herein. In addition, those skilled in the art will appreciate that implementations may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Implementations of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary implementations, the subject matter described herein is implemented in conjunction with a virtual user relationship management (CRM) application in a multi-tenant environment.

Conclusion and Particular Implementations

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, introduction, compact task deployment, processes, and multi-tenant system.

We describe a system and various implementations for compact deployment of tasks in a stream processing system by decoupling deployment of application code from the deployment of dependencies required to execute the application code. In implementations, the application code is deployed without its dependencies to a container that locally stores the dependencies as precompiled libraries. At runtime, the application code is linked with the precompiled libraries without recompiling the precompiled libraries.

Some additional implementations and features include:

In one implementation, described is a method of compact task deployment for a stream processing system. The method includes defining a container by selecting whole machines from a computing grid, with each machine utilizing one or more worker nodes having a plurality of workers that process event streams running in the container, initializing the workers nodes with precompiled dependency libraries having precompiled classes and defining tasks for the workers and modifications to the tasks in dependence upon some of the precompiled classes. The method also includes deploying the tasks and task modifications to the container, including, for a first task storing a definition version in a container registry and updating the container registry with new definition versions identifying modifications to the first task, determining a set of precompiled classes required to execute a latest definition version of the first task, and scheduling the workers to execute the latest definition version at runtime without recompilation of the set of precompiled classes.

In one implementation, the tasks are code that define a directed acyclic graph for processing events from event streams running the container. In some implementations, the events are continuous and unbounded sequence of real-time tuples. In another implementation, the tasks are code that set filters for qualifying events from the event streams.

In some implementations, the tasks and task modifications are deployed to the container by converting class definitions of the tasks and task modifications into binary serializations. In some implementations, the precompiled dependency libraries and the precompiled classes are stored in java virtual machines (JVMs) of the worker nodes.

In one implementations, the set of precompiled classes are identified based on classpaths of the first task identified by the latest definition version and the set of precompiled classes are bounded to the classpaths.

In some implementations, scheduler is used to schedule the workers. In some implementations, the workers are scheduled to execute the latest definition version at runtime without decommissioning the worker nodes.

In implementations, the tasks and task modifications are deployed to the container between 300 milliseconds and 6 seconds. In implementations, the tasks and task modifications are less than 1 megabyte (MB) in size Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method comprising:
dispatching, by a coordinator executing in a container on one or more computing devices represented as a set of worker nodes, a first batch from a stream to a worker node of the set of worker nodes grouped by the container and executing on the one or more computing devices, wherein the worker node is configured to process the first batch in accordance with first application code retrieved from a registry and configured to link to a precompiled library on the worker node to satisfy a first dependency; and
dispatching, by the coordinator executing in the container on the one or more computing devices, a second batch from the stream to the worker node executing on the one or more computing devices, wherein the worker node is reconfigured to process the second batch in accordance with second application code different from the first application code and is retrieved from the registry and configured in the registry, prior to dispatching of the second batch, to link to the precompiled library on the worker node to satisfy a second dependency, wherein the worker node is reconfigured without decommissioning of the worker node and in response to completed processing of the first batch.

2. The method of claim 1, further comprising:
identifying a precompiled class in the precompiled library associated with the second dependency; and
binding the precompiled class to a classpath associated with the second application code.

3. The method of claim 1, further comprising:
storing the precompiled library in a virtual machine of the worker node.

4. The method of claim 1, further comprising:
determining the first application code based at least in part on converting a class definition associated with the first application code into a binary serialization.

5. The method of claim 1, wherein the first batch includes an event of an event stream, and the first application code defines a directed acyclic graph configured to process the event.

6. The method of claim 5, wherein the event includes a continuous and unbounded sequence of real-time tuples.

7. The method of claim 1, wherein the first batch includes an event of an event stream, and the first application code implements a filter for qualifying the event.

8. A non-transitory computer-readable device having instructions stored thereon that, when executed by at least one computing device, causes the at least one computing device to perform operations comprising:
dispatching, by a coordinator executing in a container on the at least one computing device represented as a set of worker nodes, a first batch from a stream to a worker node of the set of worker nodes grouped by the container, wherein the worker node is configured to process the first batch in accordance with original application code retrieved from a registry and configured to link to a precompiled library on the worker node to satisfy a first dependency; and
dispatching, by the coordinator executing in the container, a second batch from the stream to the worker node executing in the container, wherein the worker node is reconfigured to process the second batch in accordance with updated application code different from the original application code and is retrieved from the registry and configured in the registry, prior to dispatching of the second batch, to link to the precompiled library on the worker node to satisfy a second dependency, wherein the worker node is reconfigured without decommissioning of the worker node and in response to completed processing of the first batch.

9. The non-transitory computer readable storage medium of claim 8, the operations further comprising:
identifying a precompiled class in the precompiled library associated with the second dependency; and
binding the precompiled class to a classpath associated with the updated application code.

10. The non-transitory computer readable storage medium of claim 8, the operations further comprising:
storing the precompiled library in a virtual machine of the worker node.

11. The non-transitory computer readable storage medium of claim 8, the operations further comprising:
determining the original application code based at least in part on converting a class definition associated with the original application code into a binary serialization.

12. The non-transitory computer readable storage medium of claim 8, wherein the first batch includes an event of an event stream, and the original application code defines a directed acyclic graph configured to process the event.

13. The non-transitory computer readable storage medium of claim 12, wherein the event includes a continuous and unbounded sequence of real-time tuples.

14. The non-transitory computer readable storage medium of claim 8, wherein the first batch includes an event of an event stream, and the original application code implements a filter for qualifying the event.

15. A system, comprising:
a memory including a worker node of a set of worker nodes grouped by a container; and
at least one processor represented as the set of worker nodes and coupled to the memory and configured to:
dispatch, by a coordinator executing in the container, a first batch from a stream to the worker node, wherein the worker node is configured to process the first batch in accordance with first application code retrieved from a registry and configured to link to a precompiled library on the worker node to satisfy a first dependency;
dispatch, by the coordinator executing in the container, a second batch from the stream to the worker node, wherein the worker node is reconfigured to process the second batch in accordance with second application code different from the first application code and is retrieved from the registry and configured in the registry, prior to dispatching of the second batch, to link to the precompiled library on the worker node to satisfy a second dependency, wherein the worker node is reconfigured without decommissioning the worker node and in response to completed processing of the first batch.

16. The system of claim 15, wherein the at least one processor is further configured to:
identify a precompiled class in the precompiled library associated with the second dependency; and
bind the precompiled class to a classpath associated with the first application code.

17. The system of claim 15, wherein the at least one processor is further configured to:
determine the first application code based at least in part on converting a class definition associated with the first application code into a binary serialization.

18. The system of claim 15, wherein the first batch includes an event of an event stream, and the first application code defines a directed acyclic graph configured to process the event.

19. The system of claim 18, wherein the event includes a continuous and unbounded sequence of real-time tuples.

20. The system of claim 15, wherein the first batch includes an event of an event stream, and the first application code sets a filter for qualifying the event.

* * * * *